United States Patent
Levy

(10) Patent No.: US 9,349,411 B2
(45) Date of Patent: May 24, 2016

(54) DIGITAL WATERMARKING AND FINGERPRINTING APPLICATIONS FOR COPY PROTECTION

(75) Inventor: Kenneth L. Levy, Stevenson, WA (US)

(73) Assignee: Digimarc Corporation, Beaverton, OR (US)

(*) Notice: Subject to any disclaimer, the term of this patent is extended or adjusted under 35 U.S.C. 154(b) by 2667 days.

(21) Appl. No.: 10/622,180

(22) Filed: Jul. 16, 2003

(65) Prior Publication Data

US 2004/0059933 A1 Mar. 25, 2004

Related U.S. Application Data

(60) Provisional application No. 60/396,893, filed on Jul. 16, 2002.

(51) Int. Cl.

| | |
|---|---|
| *G06F 17/30* | (2006.01) |
| *G11B 20/00* | (2006.01) |
| *G06F 21/10* | (2013.01) |
| *H04N 5/913* | (2006.01) |
| *H04N 21/8358* | (2011.01) |

(52) U.S. Cl.
CPC .......... *G11B 20/00086* (2013.01); *G06F 21/10* (2013.01); *G11B 20/00123* (2013.01); *G11B 20/00768* (2013.01); *G11B 20/00884* (2013.01); *H04N 5/913* (2013.01); *H04N 21/8358* (2013.01); *H04N 2005/91321* (2013.01); *H04N 2005/91328* (2013.01)

(58) Field of Classification Search
CPC .............. G06F 21/10; G11B 20/00086; G11B 20/00123; G11B 20/00768; G11B 20/00884; H04N 2005/91328; H04N 5/913; H04N 21/8358; H04N 2005/91321

USPC ............... 713/200, 176; 705/51, 57; 382/100; 726/26, 27, 30–32

See application file for complete search history.

(56) References Cited

U.S. PATENT DOCUMENTS

| | | |
|---|---|---|
| 4,528,588 A | 7/1985 | Lofberg |
| 5,103,476 A | 4/1992 | Waite |
| 5,319,705 A | 6/1994 | Halter |

(Continued)

FOREIGN PATENT DOCUMENTS

| | | |
|---|---|---|
| WO | 96/31049 | 10/1996 |
| WO | 03030447 | 9/2002 |

OTHER PUBLICATIONS

Ton Kalker,"System Issues in Digital Image and Video Watermarking for Copy Protection," published in 1999, pp. 562-567.*

*Primary Examiner* — Baotran N To
(74) *Attorney, Agent, or Firm* — Digimarc Corporation

(57) ABSTRACT

Improved copy protection systems including copy once, personal computer (PC) buffer copy protection, and identifying different copy control systems are provided. A "copy once" protection system uses memory in a recording device to remember content or physical media IDs so that the same original content or media is not copied twice. A PC buffer copy protection system determines if there is a relationship between input and output buffers on a PC, or networked PCs, to determine if the content can be copied. Different copy control systems, such as DVD systems and Conditional Access (CA) TV systems, can use different copy control watermark keys or payloads to identify which type of copy control system should be implemented.

25 Claims, 2 Drawing Sheets

(56) References Cited

U.S. PATENT DOCUMENTS

| | | | |
|---|---|---|---|
| 5,321,841 A | 6/1994 | East | |
| 5,410,598 A | 4/1995 | Shear | |
| 5,464,997 A | 11/1995 | Watanabe | |
| 5,473,692 A | 12/1995 | Davis | |
| 5,519,778 A | 5/1996 | Leighton | |
| 5,629,980 A | 5/1997 | Stefik | |
| 5,646,997 A | 7/1997 | Barton | |
| 5,646,999 A | 7/1997 | Saito | |
| 5,765,152 A | 6/1998 | Erickson | |
| 5,845,281 A | 12/1998 | Benson | |
| 5,915,019 A | 6/1999 | Ginter | |
| 5,940,504 A | 8/1999 | Griswold | |
| 5,943,422 A | 8/1999 | Van Wie et al. | |
| 5,991,876 A | 11/1999 | Johnson | |
| 5,991,878 A * | 11/1999 | McDonough et al. | 726/9 |
| 5,995,625 A | 11/1999 | Sudia | |
| 6,122,403 A | 9/2000 | Rhoads | |
| 6,141,753 A | 10/2000 | Zhao et al. | |
| 6,182,218 B1 | 1/2001 | Saito | |
| 6,185,683 B1 | 2/2001 | Ginter | |
| 6,209,092 B1 | 3/2001 | Linnartz | |
| 6,233,684 B1 | 5/2001 | Stefik | |
| 6,236,971 B1 | 5/2001 | Stefik | |
| 6,272,634 B1 | 8/2001 | Tewfik et al. | |
| 6,286,036 B1 | 9/2001 | Rhoads | |
| 6,311,214 B1 | 10/2001 | Rhoads | |
| 6,324,573 B1 | 11/2001 | Rhoads | |
| 6,370,319 B1 | 4/2002 | Matsumoto | |
| 6,398,245 B1 | 6/2002 | Gruse | |
| 6,449,367 B2 | 9/2002 | Van Wie et al. | |
| 6,490,355 B1 * | 12/2002 | Epstein | 380/203 |
| 6,519,352 B2 | 2/2003 | Rhoads | |
| 6,522,769 B1 | 2/2003 | Rhoads et al. | |
| 6,687,802 B1 * | 2/2004 | Kori et al. | 711/163 |
| 6,768,808 B2 | 7/2004 | Rhoads | |
| 6,778,682 B2 | 8/2004 | Rhoads | |
| 6,807,534 B1 | 10/2004 | Erickson | |
| 6,816,596 B1 | 11/2004 | Peinado | |
| 6,829,368 B2 | 12/2004 | Meyer et al. | |
| 6,836,844 B1 * | 12/2004 | Kori et al. | 713/176 |
| 6,850,252 B1 * | 2/2005 | Hoffberg | 715/716 |
| 6,868,497 B1 | 3/2005 | Levy | |
| 6,993,153 B2 | 1/2006 | Bradley | |
| 7,009,921 B1 * | 3/2006 | Otsuka et al. | 369/47.17 |
| 7,035,427 B2 | 4/2006 | Rhoads | |
| 7,062,069 B2 | 6/2006 | Rhoads | |
| 7,110,984 B1 * | 9/2006 | Spagna et al. | 705/57 |
| 7,158,654 B2 | 1/2007 | Rhoads | |
| 2001/0000541 A1 * | 4/2001 | Schreiber et al. | 713/100 |
| 2001/0001854 A1 | 5/2001 | Schena et al. | |
| 2001/0008557 A1 | 7/2001 | Stefik | |
| 2001/0020242 A1 | 9/2001 | Gupta et al. | |
| 2001/0021144 A1 | 9/2001 | Oshima et al. | |
| 2001/0026618 A1 | 10/2001 | Van Wie | |
| 2001/0042043 A1 * | 11/2001 | Shear et al. | 705/51 |
| 2001/0044899 A1 * | 11/2001 | Levy | 713/176 |
| 2001/0055391 A1 | 12/2001 | Jacobs | |
| 2001/0056573 A1 | 12/2001 | Kovac et al. | |
| 2002/0002468 A1 | 1/2002 | Spagna | |
| 2002/0007456 A1 | 1/2002 | Peinado | |
| 2002/0015494 A1 | 2/2002 | Nagia et al. | |
| 2002/0048369 A1 | 4/2002 | Ginter | |
| 2002/0059238 A1 | 5/2002 | Saito | |
| 2002/0071556 A1 | 6/2002 | Moskowitz et al. | |
| 2002/0107803 A1 | 8/2002 | Lisanke | |
| 2002/0112171 A1 | 8/2002 | Ginter | |
| 2002/0114458 A1 | 8/2002 | Belenko et al. | |
| 2002/0122369 A1 | 9/2002 | Sako et al. | |
| 2002/0183967 A1 | 12/2002 | Epstein | |
| 2003/0159043 A1 * | 8/2003 | Epstein | 713/176 |
| 2005/0071377 A1 | 3/2005 | Mihcak | |

\* cited by examiner

DIGITAL WATERMARKING AND FINGERPRINTING APPLICATIONS FOR COPY PROTECTION

RELATED APPLICATION DATA

This application claims the benefit of U.S. Provisional Patent Application No. 60/396,893, filed Jul. 16, 2002, which is herein incorporated by reference.

TECHNICAL FIELD

The invention relates to digital watermarking, digital fingerprinting, and the use of such technology for copy protection.

BACKGROUND AND SUMMARY

Digital watermarking is a process for modifying physical or electronic media content to embed a hidden machine-readable code into the media. In digital watermarking, a media content signal, such as an image or audio signal, is modified to embed a hidden, digital auxiliary code signal such that the auxiliary signal is imperceptible or nearly imperceptible to the user, yet may be detected through an automated detection process. Most commonly, digital watermarking is applied to media content signals such as images, audio signals, and video signals. However, watermarking may also be applied to other types of media objects, including documents (e.g., through line, word or character shifting, through background patterns or tints, etc.), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed, e.g., in the assignee's co-pending U.S. patent application Ser. No. 09/503,881 (U.S. Pat. Nos. 6,614,914) and 6,122,403, which are each hereby incorporated by reference.

Another technology referred to as fingerprinting, in contrast to digital watermarking, does not embed auxiliary data in a media signal, but rather, derives a unique content signal identifier from the media signal itself. For some applications where the signal undergoes a transformation in normal use, such as compression, transmission, or digital to analog to digital conversion, the fingerprint (or host signal characteristics used to determined a fingerprint) preferably remains relatively unchanged, allowing unique identification of the content signal. Fingerprints for a wide selection of media signals may be stored in a database and associated with information or actions to be taken upon detection or calculation of a fingerprint.

Aspects of the present invention are now discussed relative to three related environments; namely, i) Copy Once Systems; ii) PC Buffer Copy Protection; and Efficient Interaction of Several Watermarking Systems for Copy Control. (Of course, my inventive techniques can be applied to many other environments as well.).

Copy Once Systems

In some applications, it is critical to copy protect digital content, such as DVD videos, since it is easy and fast to make exact digital reproductions. Digital watermarking, data headers, and encryption systems can be used to designate content as a particular copy state, such as: copy never, copy once, copy no more, or copy freely (where copy freely is sometimes signaled, e.g., by the lack of a digital watermark, header, or encryption system).

On pre-recorded read-only media (e.g., media including a digital watermark indicating "copy once" content), a copy of the read-only media (or "duplicate copy") is turned into "copy no more" by adding a robust watermark or removing a fragile watermark. This digital watermark (or removal of a fragile watermark) indicates that the duplicate copy is indeed a copy (which is perhaps designated as a "copy never" state). However, the original "copy once" read-only content can be copied again and again on the same recording device.

Similarly, on pre-recorded read-only media, a file header and/or encryption system can also only enable copy one generation because the original media cannot be modified (as it is read-only). The duplicate copy of the recorded media can be updated as copy no more by changing the header or encryption system metadata, but not the original. As such, the original can be copied again and again on the same device.

To stop a device from creating multiple copies of "copy once" content, a digital watermark, fingerprint, or out of band header identifier (ID) can be used to identify content (referred to as a "content ID" or "content identifier") and a content ID can be stored in a recorder device (e.g., in a case where content is labeled or designated as copy once). When content is to be recorded, its content ID is checked, and if it matches or coincides with a stored content ID on that device or within a personal home network (PHN), recording is not enabled, prevented or stopped. (I also envision a scenario where a content ID is stored remotely from a copy device (e.g., accessible via the internet or home network), and a copy or recording device queries the remote database to determine whether to allow copying.). This process turns a copy one generation into copy once for this device or PHN. The user can copy the original in another recorder or PHN, but only once, and this becomes expensive to have one device or PHN for every copy—as well as helps devices or PHNs identify a pirate as opposed to a consumer wanting an archival copy.

PC Buffer Copy Protection

Currently, no matter if there is hardware encryption protection, such as Microsoft (MS) Palladium (now called Next-Generation Secure Computing Base (NGSCP)), or software encryption protection, such as MS SAP (secure audio path) or IBM EMMS (electronic media management system), a consumer can easily bypass the security by recording the decrypted output buffer after rendering. For example, on many IBM Thinkpads (such as the year 2000 600× model) the soundcard can digitally record the output play buffer by setting the recording option in Windows mixer to loopback. Thus, a perfect copy of any protected music can be made.

Currently, there are products to digitally capture the sound buffer, even when loopback options are not available in the mixer, such as with Total Recorder from High Criteria, Inc. Similar products will be made for video capture, but are not available yet because, e.g., people are just starting to watch valuable video on the PC.

In addition, anyone can easily copy audio and video by physically looping back the final, usually analog, output. For example, a person can record audio on the PC by connecting the audio line out (e.g., an output port) to the audio line in (e.g., an input port) with an inexpensive (only several dollars) cable with two ⅛" stereo plugs, as sold at Radio Shack, for connecting speakers to a sound card. Similarly, a person can record the video on a PC by connecting the S-video out to the video in on a PC equipped with a video output and capture card, or via a digital camcorder connected to a PC. Soon, PCs will have digital audio and video outs, which can be physically looped back for perfect copying.

This type of recording can be stopped on a PC or a group of networked PCs by comparing a content ID of content stored in the input buffer with a content ID of content stored in the output buffer of the PC or a group of networked PCs and stopping or preventing recording if the content IDs match (e.g., assuming the content is protected content). This system significantly raises the barrier of copying by requiring the consumer to use 2 non-networked PCs.

Efficient Interaction of Several Watermarking Systems for Copy Control

Many watermark-based copy control systems are designed for one digital watermark protocol and one system. For example, one video watermark can provide play and record control for DVDs. Another video watermark, probably related to but slightly different than for DVD, for example, can provide similar functionality for another system, such as conditional access (hereafter "CA") television (TV).

The copy control watermark can provide four copy control states, including copy never, copy once, copy no more, and copy freely. In one implementation, bits of a digital watermark payload, e.g., where 2 bits are needed for each state, provides this functionality. In an alterative implementation, a digital watermark embedded according to a different key indicates which copy control state is associated with the media content.

For example, four different keys, each representing a different copy control state, can be used. The key is preferably a pseudo-random sequence that is used to embed the watermark, but it need not be. For example, the key can specify locations for watermark embedding, host signal features to be modified to effect embedding, indicate a watermark characteristic, and/or semantic meaning of particular features (e.g., how modifications to the host signal are mapped to particular data symbols, such as binary or M-ary symbols), etc.

There can be additional states like pause, length of pause, analog output enabled, secure digital output required, etc.

However, an overall system, to efficiently provide a similar, but different, copy control watermark, has not been defined.

My solution can provides different copy protection systems or phases of a system by varying a watermark key or keys, and/or by embedding additional bits into the digital watermark payload.

Further features and advantages of the invention will become even more apparent with reference to the following detailed description and the accompanying drawings.

DETAILED DESCRIPTION

Copy Once Systems

Figure 1:
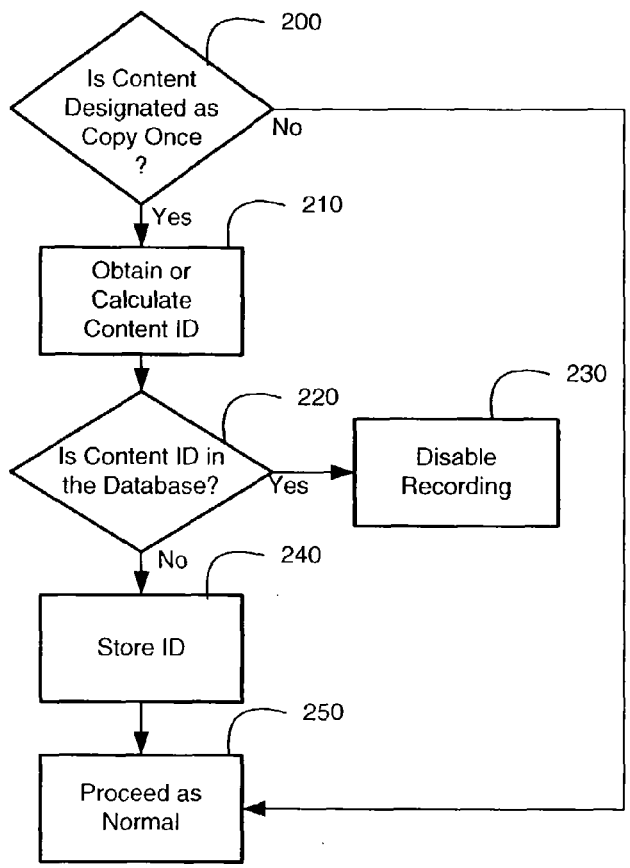
FIG. 1 shows a flowchart illustrating operation of a copy once system.

FIG. 1 is a flowchart illustrating a process to implement the "copy once" system summarized above. Step 200 determines whether media content (e.g., audio, video, images) is copy once protected. This step may include, e.g., reading a digital watermark embedded in the content (e.g., a digital watermark payload may indicate "copy once," or the very presence of a watermark may indicate copy once content). Copy once may also be indicated by a file header, which is sent along with the content, or communicated by an encryption system. If the content is not copy once, the process preferably proceeds as normal, as shown in step 250.

If the media content is copy once protected, a content ID is obtained from the copy once protected content (step 210). This content ID can be obtained from a data header in the content or encryption system, from a digital watermark, or by calculating a fingerprint (or hash) of the content itself. The content ID can even be a unique text. However, binary unique content IDs are optimal since they require the minimal storage memory on a recording device (e.g., a DVD recorder). (In an alternative implementation, a serial number from physical media, like a CD or DVD, is used as a content or other identifier. This type of identification is particularly advantageous for a system in which recording devices are linked to a network, such as the internet or home network, so that a database can be used to store an association between the physical media serial number and a content ID, and provide the content ID in response to receiving the corresponding serial number.).

Alternatively, a physical media (e.g., a DVD) serial number can be used as a content identifier. This physical media serial number is unique for each media copy (e.g., each DVD disc) and may be related to the Content Scrambling System (CSS) used today or any encryption/scrambling system used in the future. Using the serial number as a content ID creates a copy once atmosphere for that specific DVD, thus requiring the person to acquire another DVD with the same content to continue copying.

Step 220 compares the extracted content ID to a data repository or database of IDs stored in the recording device. It is preferably that this database of content IDs be resistant to tampering, such as turning off device power or resetting. Of course, the content IDs may be stored in an alternative location, remote from the recording device, so long as the data repository or database is accessible to the recording device, such as a network server or set-top box. (I use the terms "data repository" and "database" broadly herein to include, e.g., electronic memory circuits, magnetic or optical memory, software controlled databases or records, look up tables, content in caches or buffers, etc., etc.)

Recording devices will soon be networked into personal home networks (PHN), such as being described in standards including European Broadcast Union's Digital Video Broadcast Copy Protection Technical group (EBU DVB-CPT) and DVD Copy Protection Technical Working Group's Broadcast Protection Discussion Group (DVD CPTWG BPDG), and encompassed in products such as Thomson's SmartRight™ system. In these cases, a recording device can check with the media server or another location storing the master database of the content IDs (and make sure only one recording device in the PHN records the copy once protected media). Alternatively, there may not be a master database, but the recording device can check with some or all of the other identified recording devices in the system. For example, the memory of the devices in the system can be used to create a distributed database, where each device stores a portion (or replica) of the database and can communicate the data in its databases to the other devices.

In step 230, if the content ID is in the database, the content cannot be copied, so recording is disabled, prevented or stopped (if recording is in progress) and the user optionally may be notified. The system may not want to notify the user of the reason and/or at the moment the comparison is performed because this makes the system easier to hack.

In step 240, if the content ID is not in the database, the new content ID is stored in the database (e.g., in the device database, master database or distributed database).

This system generally assumes that content is not so-called "legacy" content, in which older content does not contain a content ID. If no content ID can be obtained or extracted in step 210, but the content is copy once, the system will preferable jump to step 250 and proceed as designed (e.g., proceed under unrestricted operation).

In step 250, the recording system proceeds as designed.

This invention of turning copy one generation watermarking into pseudo-copy once (meaning, e.g., that every device or PHN can only copy the content once) may remove the need for the watermark remarking of duplicate copies, if all content is watermarked pseudo-copy once. Since, without requiring remarking capabilities, an embedder is not needed in each recording device, the watermarking system is less expensive to implement. Similarly, an encryption container for the content may not need to be unencrypted and re-encrypted in recorders when using this system. As such, this invention can decrease the cost of a copy protection system (based upon the fact that a database of content IDs in tamper proof memory is less expensive than a watermark embedding and/or encryption/decryption system) while improving content protection.

PC Buffer Copy Protection

This section addresses excessive copying and piracy problems addressed above (see the Summary section) where a computer's output port is looped or tied back into its input port.

Figure 2:
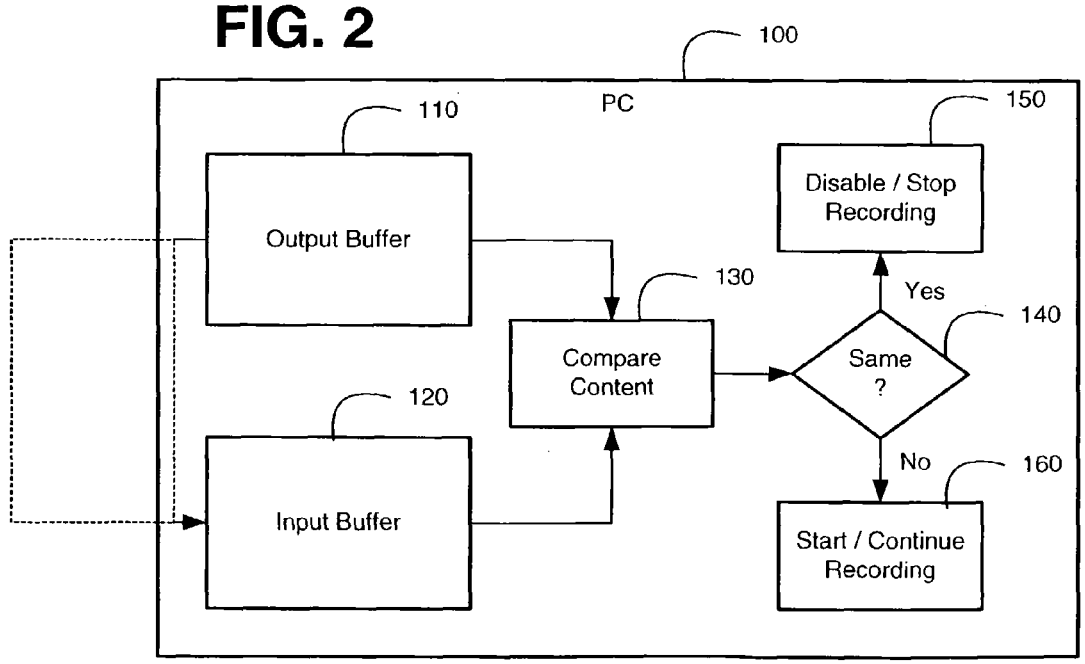
FIG. 2 shows an overview of a system for copy protection for digital PC buffers.

As shown in FIG. 2, when a Personal Computer (PC) 100 is recording protected content (e.g., audio, images and/or video), the PC's operating system (OS) or similar security program/module can monitor the PC's output buffer 110 and input buffer 120 to compare the content in each buffer, as shown in step 136. (We use the term "buffer" very broadly in this document. For example, the term buffer may encompass memory caches, electronic memory circuitry, storage locations on fixed or removable media, etc. The term "protected content" implies that the content should not be copied (e.g., "copy never" or "copy no more") or, at most, copied only subject to limitations ("copy once"). In the case of copy once, the techniques, e.g., disclosed with respect to FIG. 1 can be combined with those discussed, here, with reference to FIG. 2.). The content comparison step 130 can be based upon, e.g., detecting a watermark content ID from a digital watermark embedded in buffer content, calculating a fingerprint for content in each of the output buffer 110 and input buffer 120, or directly comparing content in the buffers, such as with cross-correlation.

The watermark IDs for the input and output buffer can be directly compared, and if they are equal (or coincide within a predetermined tolerance) the content is determined to be the same. Time delays do not have to be dealt with if the system knows the watermark payload structure and can extract the content ID. The complete watermark ID can still be changed throughout the song, by keeping the content ID portion of the watermark constant and adjoining a dynamic portion in the payload structure. However, if the payload changes over time without a constant content ID section, watermark IDs should be kept for a certain amount of time and compared across time to see if the watermark ID's ever match, thus showing that the content is identical. Alternatively, the watermark ID can be used to identify the content from a local or remote database, and if the output of the database (i.e. identified content) is the same for each buffer, the content is the same.

The fingerprints can be compared between the input 120 buffer and the output 110 buffer. For example, each fingerprint is computed on the content, or a portion of the content, in each buffer. As a result, the system preferably handles misalignment of the portions of the content in each buffer used to create the fingerprint for comparison. In a direct comparison of fingerprints, several time delays can be checked such that the comparison is not inaccurate due to a transmission (or maliciously added) delay between the output 110 and input 120 buffers. In fact, if the system has access to a metric indicating how the fingerprint of a portion of the content changes over time (e.g., audio track or song), the system can use a comparison time step related to that metric to avoid errors due to misalignment of the content in the buffers.

Alternatively, each buffer's fingerprint can be used to identify the content from a local or remote database, and then the output of the database can be compared to see if the content is identical.

For audio, when directly comparing the audio buffer, it is preferable to compare frequency domain features of the buffer contents, such as Fourier or Wavelet domain transform, and particularly a transform based upon critical bands or Bark scale. This approach advantageously leverages the fact that logarithmically spaced frequency bands are a closer representation of the perceived audio than the time signal, and the goal is to determine if the audio in the input and output buffer are the same based upon perception.

For video, when directly comparing the video frame buffers, time, frequency, luminous, or other transform domains can be used. The optimal domain is closest to the perceived video since the goal is to identify video perceived as the same. In addition, as described for fingerprinting, several time delays should be checked such that the comparison is not inaccurate due to a transmission (or maliciously added) delay between the output and input buffer. Specifically, a cross-correlation version time can be used, and the content is identified as identical if the cross-correlation shows a peak (e.g., local maxima indicating high correlation). Once again, a time step related to the time accuracy of the cross-correlation can be used, with a larger time step more computationally efficient.

As shown in step 140, after comparing the content in each buffer, it is determined whether the content is the same.

As shown in step 150, if the content is determined to be the same, recording is stopped or disabled (if it has been started). The user may be notified that the content being played and recorded (or to be recorded) is identical, and, since the content is protected, the recording has been stopped (or disabled). Of course, the system may not want to notify the user, or give the reason for the interruption of the output since this comparison is performed because this makes the system easier to hack. A slightly better notification method adds some random delay between the buffer comparison and user notification to increase the difficulty of hacking.

As shown in step 160, if the protected content is determined not to be the same, the recording continues as before (or is enabled).

This process can be repeated at any time interval, or based upon a user refresh option (assuming the user is notified of the stopped or disabled recording). The shorter the time segments, the more CPU cycles used, but the system is more precise.

In addition, the PC may not be a single PC, but any configuration of PC's on a network, with one server or a distributed system acting to compare a matrix of input and output buffers for each PC. Maximum security is obtained if this is done at low levels, such as the kernel level 0 of the OS, and linked to hardware security and processing, such as in Microsoft's Palladium architecture.

Additionally, several input and output buffers may be used on a PC, especially for video, with all or some being active. In a multi-buffer scheme, a comparing step 130 may involve a matrix of these buffers, with, perhaps, only the active buffers being analyzed. The comparison can be improved if the active buffers are identified. Or, if video buffers are linked to a device, only video output and video capture buffers need to be checked, and not display buffers for programs such as MS Word.

Content can be marked as protected in many forms, such as from a digital watermark steganographically embedded in the content itself, out of band (e.g., a header) metadata tag, and encryption system. In fact, unidentified content can be assumed to be protected, such that the only non-protected content is content that is marked as not copy protected (a.k.a. copy freely or copy control not asserted).

Fingerprints

Content fingerprinting, which are methods to identify media content based upon the content itself, typically require a database to perform some processing to match an incoming fingerprint to fingerprints in the database. The larger the database is, the more processing is generally required by the database, and the less accurate, perhaps, the system.

Figure 3:
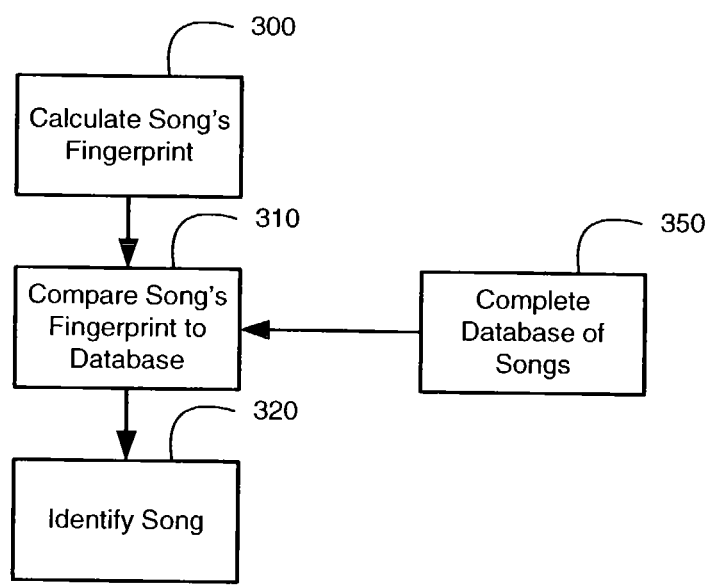
FIG. 3 shows a method of identifying songs with audio fingerprints.

FIG. 3 shows a method of identifying songs with fingerprints. The first step 300 calculates a fingerprint for a song or section of the song.

The second step 310 compares the calculated fingerprint to the database 350 to find the closest match. This comparison step may involve some type of distance calculation between the calculated fingerprints (sometimes including sub-fingerprints) and the database entries, which is computationally intensive and may increase the likelihood of error as the database becomes larger. Even in fingerprint methods that do not involve distance measurements, a larger database increases the likelihood of error. For example, if the fingerprint ID is erroneous due to background noise or a voice over, for example, it is more likely to match a database ID in a larger database.

The third step 320 involves identifying the song once the song's fingerprint is matched in the database.

Efficient Interaction of Several Watermarking Systems for Copy Control

Copy Control via Four Keys, with Different System Keys

In copy control systems that handle four copy states (e.g., copy never, copy once, copy no more, copy freely), different watermark "keys" can be used to identify a particular copy control system, such as DVD and conditional access (CA), and perhaps identify different copy states. For example, DVD control may uses keys 1 through 4 (with, e.g., key 1=DVD copy never; key 2=DVD copy once; key 3=DVD copy no more; and key 4=DVD copy freely; or the like), and CA control may uses keys 5 through 8 (with, e.g., key 5=CA copy never; key 6=CA copy once; key 7=CA copy no more; and key 8=CA copy freely; or the like). A watermark key in this context reveals some secret about a watermark or watermark embedding or decoding process. For example, the key reveals information about a watermarking protocol, a watermark embedding/decoding characteristic and/or a watermark payload encryption key. In one implementation a key provides a pseudo-random sequence that is used to embed the watermark. In another example, a key specifies locations for watermark embedding, host signal features to be modified to effect embedding, and/or semantic meaning of particular features (e.g., how modifications to the host signal are mapped to particular data symbols, such as binary or M-ary symbols), etc., etc.

Similarly, if default rules for a system change over time, such as the interpretation of copy once, a new key for the copy once state can be used to determine which rules should be obeyed. Additionally, if a new architecture is used that requires, e.g., a watermark reader to determine whether a given watermark was embedded before or after the architecture was implemented in a manner that affects the usage rules, a new set of four keys, one for each existing copy control state, can be used.

Copy Control via Four Keys, with Additional System Bits

In copy control systems that represent the four copy states with four keys, certain bits within a watermark payload can represent a particular copy control system, such as DVD and CA. For example, key 1 indicates a "copy never state," and a predetermined watermark payload bit(s) indicates a particular copy control system (e.g., a 0 payload in any of the four copy control states refers to a DVD system, and a 1 payload in any of the four copy control states refers to a CA system). An advantage of this system is a reduced number of keys.

Similarly, if the default rules for a system change over time, such as the interpretation of copy once, a payload bit for the copy once state can be used to determine which rules should be obeyed. Additionally, if a new architecture is used that requires the watermark reader to determine whether a given watermark was embedded before or after the architecture was implemented in a manner affecting the usage rules, a bit in each existing copy control state can be used. More specifically, the first bit could be set to 1 to verify that the watermark should follow the new architecture and not the old architecture (or government policy).

This system is efficient because a universal detector and embedder are required to have only four keys (as opposed to the number of systems times four keys). This architecture does involve the system owners agreeing on which keys to use, though.

Copy Control via One Key and a Payload, with Different System Keys

In copy control systems that represent the four copy states with one system key and the payload represents the copy control state, the copy control for different systems, such as DVD and conditional access (CA), can be represented by using a different key for each system. For example, DVD control uses key A, and CA control uses key B.

Similarly, if the default rules for a system change over time, such as the interpretation of copy once, a new key for the copy once state can be used to determine which rules should be obeyed. Additionally, if a new architecture is used that requires the watermark reader to determine if a given watermark was embedded before or after the architecture was implemented in a manner affecting the usage rules, a new key can be used.

Copy Control via One Key and a Payload, with Additional System Bits

In copy control systems that represent the four copy states with one system key and the payload represents the copy control state, the copy control for different systems, such as DVD and CA, can be represented by changing another payload bit. For example, a 0 in the third payload bit in any of the four copy control states refers to a DVD system, and a 1 in the third payload bit in any of the four copy control states refers to a CA system.

Similarly, if the default rules for a system change over time, such as the interpretation of copy once, the third payload bit can be used to determine which rules should be obeyed. Additionally, if a new architecture is used that requires the watermark reader to determine whether a given watermark was embedded before or after the architecture was implement in a manner affecting the usage rules, the third bit can be used.

This system is efficient because a universal detector and embedder have only one key (as opposed to the number of keys equal to the number systems or updates). This architecture does involve system owners agreeing on which key to use, though.

The additional copy control system may not encrypt content, but rather, only watermark the content. When the watermark reader identifies such a system by a specific key or payload bit, the copy control system knows that no encrypted data path can be found for authentication.

External Flag

In some alternative implementations of the above methods and systems, a system identifier and/or upgrade identifier are external to a digital watermark, e.g., the upgrade identifier is provided via a header flag or encryption key. For example, a DVD and/or CA system may use the same watermark key and payloads, but the system knows which system is which because the content is encrypted with different keys. In another example, the DVD and CA system use different watermark keys (e.g., key A for DVD and key B for CA), and a flag in the header identifies to the system whether rules around these systems or states have been altered or upgraded.

In the external flag implementations, if content is found after rendering or conversion to analog, the external flag is lost, whereas it is not lost in the previous for cases, which use watermark keys and payloads. (See, e.g., assignee's U.S. patent application Ser. No. 10/126,921, filed Apr. 18, 2002 (published as US 2002-0186844 A1;) U.S. Pat. No. 7,266, 704) for additional environments and methods in which my techniques my suitable cooperate with. The above patent documents are herein incorporated by reference.)

Conclusion

Having described and illustrated the principles of the technology with reference to specific implementations, it will be recognized that the technology can be implemented in many other, different, forms.

(To assist the reader, please note that we use the terms "content" and "media content" interchangeably throughout this document. Also, while I have discussed a "copy once" system, my techniques apply nicely to a multi-generational copy system. For example, if media is designated as "copy twice," a data repository can be used to track the permissible two copies. Copying is disabled after the two copies are produced.)

The methods, processes, and systems described above may be implemented in hardware, software or a combination of hardware and software. For example, digital watermark encoding and decoding processes may be implemented in a programmable computer or a special purpose digital circuit. Similarly, fingerprinting may be implemented in software, firmware, hardware, or combinations of software, firmware and hardware. The methods and processes described above may be implemented in programs executed from a system's memory (a computer readable medium, such as an electronic, optical or magnetic storage device, etc.).

To provide a comprehensive disclosure without unduly lengthening the specification, applicant incorporates by reference the patent documents referenced above.

The particular combinations of elements and features in the above-detailed embodiments are exemplary only; the interchanging and substitution of these teachings with other teachings in this and the incorporated-by-reference documents are also contemplated.

What is claimed is:

1. A method of providing copy protection for protected media content on a computer system, the computer system comprising an output port and an associated output buffer, and an input port and an associated input buffer, said method comprising:

analyzing first media content buffered in the output buffer;

analyzing second media content buffered in the input buffer; and comparing the first media content buffered in the output buffer with the second media content buffered in the input buffer, wherein a copy operation is modified or disabled when the first media content and the second media content match or otherwise coincide.

2. The method of claim 1, wherein the computer system comprises a single computer system.

3. The method of claim 2, wherein the output buffer comprises a matrix of output buffers, and the input buffer comprises a matrix of input buffers.

4. The method of claim 3, wherein said comparing compares at least active output buffers with active input buffers.

5. The method of claim 1, wherein the computer system comprises at least two networked computers, with a first computer comprising the output port and a second computer comprising the input port.

6. The method of claim 5, wherein the output buffer comprises a matrix of output buffers, and the input buffer comprises a matrix of input buffers.

7. The method of claim 6, wherein said comparing compares at least content buffered in active output buffers with content buffered in active input buffers.

8. The method of claim 1, wherein the first media content comprises a first identifier embedded therein in the form of a digital watermark and the second media content comprises a second identifier embedded therein in the form of a digital watermark, and wherein said analyzing first media content buffered in the output buffer comprises obtaining the first identifier from its watermark, said analyzing second media content buffered in the input buffer comprises obtaining the second identifier from its watermark, and said comparing the first media content buffered in the output buffer and the second media content buffered in the input buffer comprises comparing at least a portion of the first identifier with at least a portion of the second identifier.

9. The method of claim 8, wherein the copy operation is modified or disabled when the portion of the first identifier and the portion of the second identifier match or otherwise coincide.

10. The method of claim 1, wherein the first media content comprises a first identifier embedded in the form of a digital watermark, and wherein said analyzing first media content buffered in the output buffer comprises obtaining the first identifier from its watermark, and said analyzing second media content buffered in the input buffer comprises obtaining a plurality of identifiers embedded as digital watermarks in the second media over a time period, and said comparing the first media content buffered in the output buffer and the second media content buffered in the input buffer comprises comparing at least a portion of the first identifier with at least portions of the plurality of identifiers.

11. The method of claim 10, wherein the copy operation is modified or disables when the portion of the first identifier and the portions of the plurality of identifiers match or otherwise coincide.

12. The method of claim 1, wherein said analyzing first media content buffered in the output buffer comprises determining a first fingerprint of the first media content, said analyzing second media content buffered in the input buffer comprises determining a second fingerprint of the second media content, and said comparing the first media content buffered in the output buffer and the second media content buffered in the input buffer comprises comparing at least a portion of the first fingerprint with at least a portion of the second fingerprint.

13. The method of claim 12, wherein the copy operation is modified or disabled when the portion of the first fingerprint and the portion of the second fingerprint match or otherwise coincide.

14. The method of claim 12, further comprising compensating for a time delay associated with the second media content, relative to the first media content.

15. The method of claim 1, further comprising determining that the media content is protected via reference to at least one of a digital watermark, header, metadata and encryption system.

16. A programmed computer system storing instructions in memory, said instructions are executable by said programmed computer system to perform the acts of claim 1.

17. A non-transitory computer readable media comprising instructions stored thereon to cause at least one multi-purpose electronic processor to perform the acts of claim 1.

18. A method of providing copy protection for protected media content on a computer system, the computer system comprising an output port and an associated output buffer, and an input port and an associated input buffer, said method comprising:
    obtaining first media content buffered in the output buffer;
    obtaining second media content buffered in the input buffer; and
    comparing the first media content buffered in the output buffer and the second media content buffered in the input buffer through correlation of the first media content with the second media content, wherein a copy operation is modified or disabled when the correlation of the first media content and the second media content indicates that the first media content and the second media content match or otherwise coincide.

19. The method of claim 18, wherein the correlation makes use of a transform domain.

20. The method of claim 19, wherein the transform domain comprises a Fourier domain.

21. The method of claim 20, wherein the first media content and the second media content each comprise audio.

22. The method of claim 19, further comprising compensating for a time delay associated with the second media content relative to the first media content.

23. A programmed computer system storing instructions in memory, said instructions are executable by said programmed computer system to perform the acts of claim 18.

24. A non-transitory computer readable media comprising instructions stored thereon to cause at least one multi-purpose electronic processor to perform the acts of claim 18.

25. A method of providing copy protection for protected media content on a computer system, the computer system comprising an output port and an associated output buffer, and an input port and an associated input buffer, said method comprising:
    obtaining first media content buffered in the output buffer;
    obtaining second media content buffered in the input buffer;
    compensating for a time delay associated with the second media content relative to the first media content; and
    comparing the first media content buffered in the output buffer and the second media content buffered in the input buffer through correlation of the first media content with the second media content, wherein a copy operation is modified or disabled when the correlation of the first media content and the second media content indicates that the first media content and the second media content match or otherwise coincide.

* * * * *